Nov. 19, 1963 R. A. KAENEL 3,111,593

BIPOLAR MONOSTABLE REGENERATIVE AMPLIFIER

Filed May 11, 1960 3 Sheets-Sheet 1

INVENTOR
R. A. KAENEL
BY Lucian C. Canepa
ATTORNEY

BIPOLAR MONOSTABLE REGENERATIVE AMPLIFIER

Filed May 11, 1960

3 Sheets-Sheet 2

INVENTOR
R. A. KAENEL
BY Lucian C. Canepa
ATTORNEY

Nov. 19, 1963 R. A. KAENEL 3,111,593

BIPOLAR MONOSTABLE REGENERATIVE AMPLIFIER

Filed May 11, 1960 3 Sheets-Sheet 3

INVENTOR
R. A. KAENEL
BY Lucian C. Canepa
ATTORNEY

United States Patent Office 3,111,593
Patented Nov. 19, 1963

3,111,593

BIPOLAR MONOSTABLE REGENERATIVE AMPLIFIER

Reginald A. Kaenel, Murray Hill, N.J., assignor to Bell Telephone Laboratories, Incorporated, New York, N.Y., a corporation of New York Filed May 11, 1960, Ser. No. 28,402
10 Claims. (Cl. 307—88.5)

This invention relates to signal translating circuits, and more particularly to bipolar monostable regenerative amplifying circuits employing negative resistance diodes.

Circuits which operate in a monostable mode to supply regenerative gain to trigger pulses are well known. The time duration or width of the amplified output pulses of such circuits is constant, thereby making the circuits well suited for performing gating and timing functions. Typically, such known circuits are unipolar, i.e., they are capable of providing amplified output pulses of a predetermined width only in response to input trigger pulses of one selected polarity.

An object of the present invention is the improvement of signal translating circuits.

More specifically, an object of this invention is the provision of bipolar monostable regenerative amplifying circuits, i.e., circuits which are capable of providing amplified output pulses of a predetermined width in response to either positive or negative trigger pulses.

A further object of the present invention is the provision of bipolar monostable regenerative amplifying circuits which are characterized by high speed, low power dissipation, high reliability, and simplicity of design.

These and other objects of the present invention are realized in a specific illustrative embodiment thereof which includes two negative resistance diodes of the voltage-controlled type connected in series-opposition. An inductor is connected in parallel with the series-opposed diodes and a constant current source is connected in parallel with one of the diodes. Pulses from an input source are applied across the inductor, and therefore also across the series-opposed diodes, and an output path is connected in parallel with the series-opposed diodes.

Normally, i.e., in the absence of the application of input trigger pulses to the circuit, each of the negative resistance diodes is biased to a quiescent point on a selected one of the positive resistance regions of its voltage-current characteristic curve, the current through one diode being approximately equal to the current through the other diode, and the sum of the voltages across the series-opposed diodes, viz., the output voltage, being approximately zero.

The application to the circuit of a relatively small positive trigger pulse causes a first one of the series-opposed diodes to switch from its quiescent point on the selected one of the positive resistance regions of its characteristic curve to a higher voltage point on another positive resistance region of its characteristic curve, a switching and charging action due to the inductor then causing the first one of the diodes to revert back to its quiescent point. During the time in which the first diode is undergoing a cycle of operation that involves being switched from its quiescent or relatively low voltage point to its relatively high voltage point and then switching and charging back to its quiescent point, the positive trigger pulse causes the condition of the other or second one of the series-opposed diodes to describe a path about its quiescent point on the selected one of its positive resistance regions. The voltage excursion of the second or unswitched diode is smaller than that of the first or switched diode. As a result, a relatively large net positive voltage of a predetermined width appears at the output of the circuit in response to a positive trigger pulse.

In a similar manner, the application to the circuit of a relatively small negative trigger pulse causes the other or second one of the series-opposed diodes to switch from its quiescent point on the selected one of the positive resistance regions of its characteristic curve to a lower voltage point on another positive resistance region of its characteristic curve, a switching and charging action due to the inductor then causing the second diode to revert back to its quiescent point. During the time in which the second diode is undergoing a cycle of operation that involves being switched from its quiescent or relatively high voltage point to its relatively low voltage point and then switching and charging back to its quiescent point, the negative trigger pulse causes the condition of the first one of the series-opposed diodes to describe a path about its quiescent point on the selected one of its positive resistance regions. The voltage excursion of the first or unswitched diode is smaller than that of the second or switched diode. As a result, a relatively large net negative voltage of a predetermined width appears at the output of the circuit in response to a negative trigger pulse.

Thus, a monostable regenerative amplifying circuit made in accordance with the principles of the present invention is capable of responding to either a positive or a negative input trigger pulse to provide an amplified output pulse of a corresponding polarity and of a predetermined width.

It is a feature of the present invention that a monostable regenerative amplifying circuit include two negative resistance diodes.

It is another feature of this invention that a monostable regenerative amplifying circuit include two negative resistance diodes connected in series-opposition.

It is still another feature of this invention that a monostable regenerative amplifying circuit include two negative resistance diodes connected in series-opposition and a constant current source connected in parallel with one of the diodes.

It is another feature of the present invention that a monostable regenerative amplifying circuit include two negative resistance diodes connected in series-opposition, a constant current source connected in parallel with one of the diodes, and an inductor connected in parallel with the series-opposed diodes.

It is a further feature of the present invention that a monostable regenerative amplifying circuit comprise two negative resistance diodes connected in series-opposition, an inductor connected in parallel with the diodes, a bipolar input source and an output path each connected in parallel with the diodes, and a constant current source connected in parallel with one of the diodes.

It is another feature of this invention that a monostable regenerative amplifying circuit comprise two voltage-controlled negative resistance diodes connected in series-opposition, an inductor connected in parallel with the series-opposed diodes, a source connected to the series-opposed diodes for biasing them to corresponding operating points on their voltage-current characteristic curves, a bipolar input pulse source connected in parallel with the inductor, and an output device responsive to the voltage appearing across the series-opposed diodes.

A complete understanding of the present invention and of the above and other features and advantages thereof may be gained from a consideration of the following detailed description of an illustrative embodiment thereof presented hereinbelow in connection with the accompanying drawing, in which:

FIGS. 1A and 2A each symbolically depict a negative resistance diode;

Figure 3A:
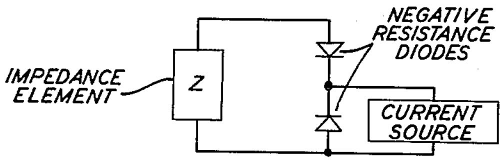
FIG. 3A shows the diodes of FIGS. 1A and 2A connected in series-opposition in a circuit arrangement including a current source and an impedance element.
Figure 3B:
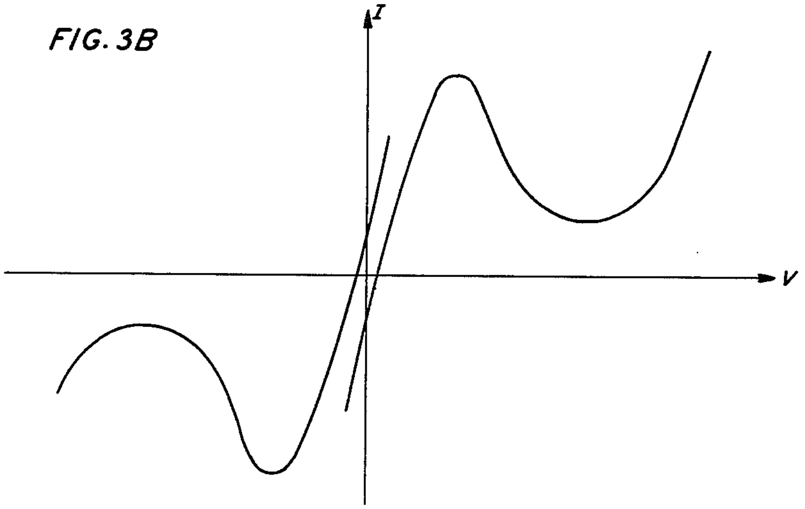
Figure 4:
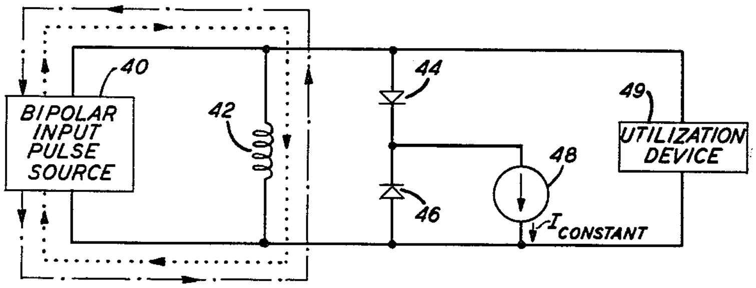
Figure 6:
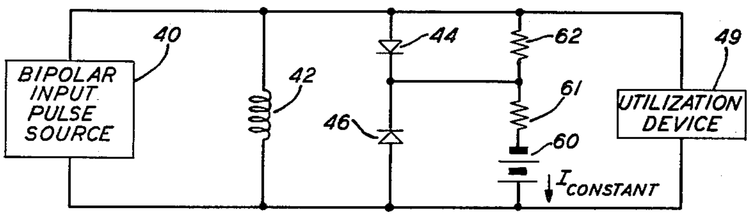
Figure 5A:
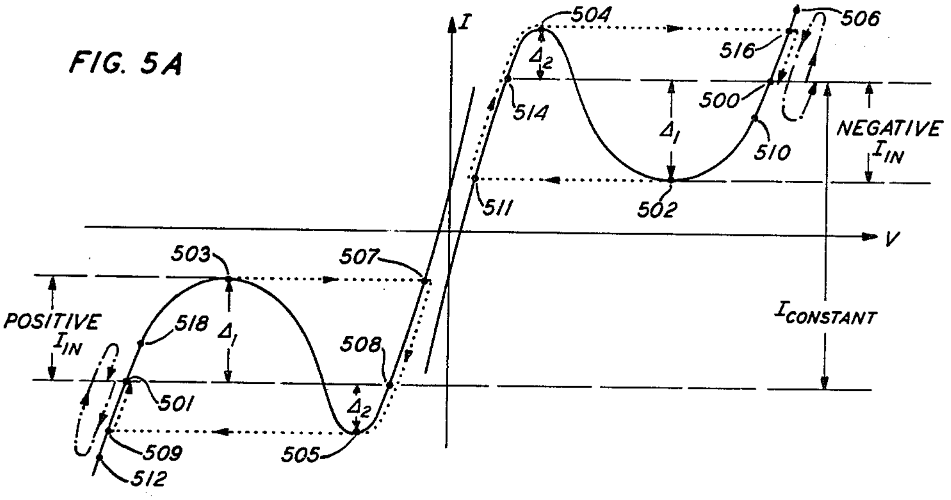
Figure 5B:
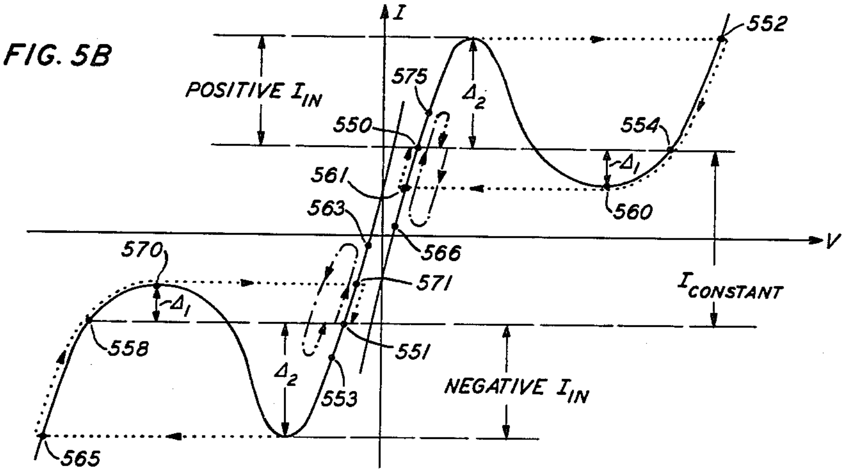
Figure 5C:
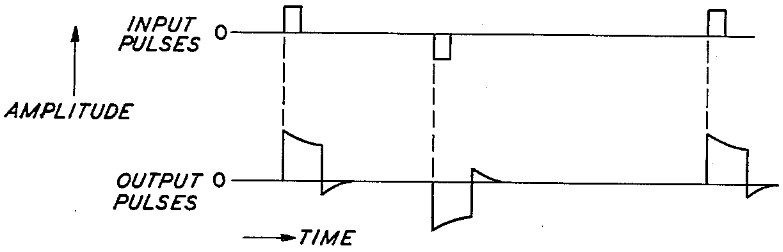

FIG. 3B approximates on a single set of axes the individual voltage-current characteristic curves of the two diodes of FIG. 3A;

FIG. 4 is a schematic showing of a specific illustrative embodiment of the principles of the present invention;

FIG. 5A approximates on a single set of axes the individual voltage-current characteristic curves of the two diodes shown in the illustrative embodiment of FIG. 4 and, further, indicates one type of diode switching action that takes place in the embodiment of FIG. 4 in response to bipolar input pulses;

FIG. 5B approximates on a single set of axes the individual voltage-current characteristic curves of the two diodes of the illustrative embodiment of FIG. 4 and, further, indicates another type of diode switching action that takes place in the embodiment of FIG. 4 in response to bipolar input pulses;

FIG. 5C shows input and output pulse waveforms characteristic of the illustrative embodiment of FIG. 4; and FIG. 6 is a more detailed schematic showing of the illustrative embodiment shown in FIG. 4.

A great variety of electronic devices and circuits exhibit negative resistance characteristics and it has long been known that such negative resistance characteristics may have one of two forms. The N-type negative resistance, which is referred to as open-circuit stable (or short-circuit unstable, or current-controlled) is characterized by zero-resistance turning points. The S-type negative resistance, which is referred to as short-circuit stable (or open-circuit unstable, or voltage-controlled) is the dual of the N-type and is characterized by zero-conductance turning points. The thyratron and dynatron are vacuum tube examples of devices which respectively exhibit N- and S-type negative resistance characteristics.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, volume 109, January–March 1958, pages 603–604, and "Tunnel Diodes as High-Frequency Devices," H. S. Sommers, Jr., Proceedings of the Institute of Radio Engineers, volume 47, July 1959, pages 1201–1206.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction: that it be narrow (the chemical transition from n-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Figure 1A:
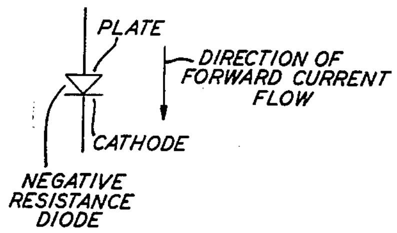
FIGS. 1B and 2B illustrate the voltage-current characteristic curves of the diodes of FIGS. 1A and 2A, respectively.

Referring now to FIG. 1A, there is shown the symbol that will be employed herein to represent a negative resistance diode of the voltage-controlled type. Also, there is shown a downwardly-extending arrow indicating the direction of forward current flow through the diode.

Figure 1B:
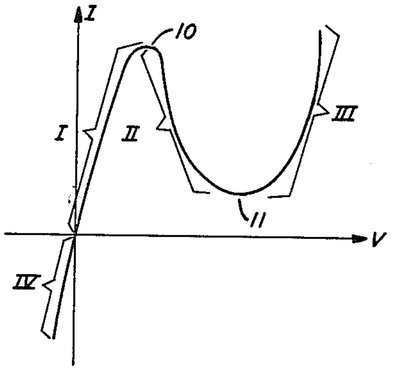

FIG. 1B, which is a graphical depiction of the relationship between the current through and the voltage across the diode of FIG. 1A, includes in the first quadrant or forward current portion thereof a first positive resistance region I, a negative resistance region II, and a second positive resistance region III. Illustratively, the absolute resistance values for the regions I, II, and III of the diode of FIG. 1A are 5 ohms, 12 ohms, and 5 ohms, respectively. Further, typical voltage and current values corresponding to the peak point 10 are 80 millivolts and 10 milliamperes, respectively, and typical voltage and current values corresponding to the valley point 11 are 350 millivolts and 2 milliamperes, respectively.

The third quadrant or reverse current portion of the voltage-current characteristics of FIG. 1B includes therein another positive resistance region IV whose resistance value is typically approximately the same as the value of the forward resistance over the regions I and III. In other words, the back or reverse resistance of the diode of FIG. 1A is about the same as the forward resistance thereof. Accordingly, unlike conventional asymmetrically-conducting diodes which have a high front-to-back resistance ratio, such a diode presents a relatively low resistance to current flow in the reverse direction. To current flow in the forward direction, such a diode is represented by an N-type characteristic, as shown in the first quadrant of FIG. 1B.

Figure 2A:
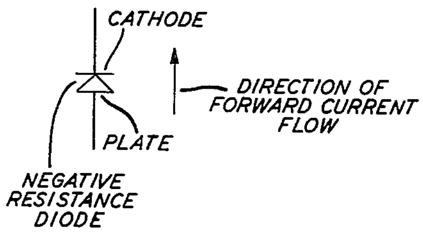

FIG. 2A shows a negative resistance diode of the voltage-controlled type whose symbolic depiction is poled in opposition to the diode illustrated in FIG. 1A. Hence, the direction of forward current flow through the diode of FIG. 2A is opposite to the direction indicated in FIG. 1A, this opposite direction being indicated in FIG. 2A by an upwardly-extending arrow.

Figure 2B:
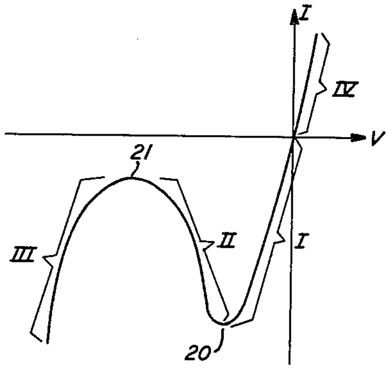

If the principles employed in forming the graphical depiction of FIG. 1B, viz., downward current shown in the first quadrant and upward current shown in the third quadrant, are also applied to the formation of the voltage-current characteristic of the diode of FIG. 2A, the plot shown in FIG. 2B results. The regions of the plot of FIG. 2B which correspond to the regions I, II, III, and IV of FIG. 1B are correspondingly identified in FIG. 2B. Further, the peak and valley points of FIG. 2B are denoted 20 and 21, respectively.

FIG. 3A is included herein simply to provide a basis for an understanding of the type of graphical depiction shown in FIG. 3B. FIG. 3A illustrates an arrangement in which two series-opposed negative resistance diodes of the voltage-controlled type are connected in circuit with a current source and an impedance element. The individual characteristics of the two diodes of FIG. 3A are plotted in FIG. 3B on a single set of axes. In fact, each of the characteristics shown in FIG. 3B should extend through the intersection of the axes. However, to avoid partially overlapping one characteristic on the other, and thereby to more clearly present the principles of this invention, each of the characteristics has been displaced slightly from the intersection. This displacement technique is also employed in the plots of FIGS. 5A and 5B.

FIG. 4 shows a specific illustrative embodiment of the principles of the present invention. The embodiment includes a bipolar input pulse source 40, an inductor 42, two voltage-controlled negative resistance diodes 44 and 46 connected in series-opposition, a constant current source 48, and a utilization device 49. The arrow in the constant current source symbol indicates the direction of current flow through the source 48. Further, the dotted line and the arrowheads thereon indicate the direction of flow in the circuit of FIG. 4 of a positive input current pulse. This current flows along a path including the series-opposed diodes 44 and 46. The dot-dash line and the arrowheads thereon indicate the direction of flow in the circuit of FIG. 4 of a negative input current pulse. This current also flows along a path including the series-opposed diodes 44 and 46.

FIG. 5A illustrates on a single set of axes, and in the displaced form described above, the individual characteristics of the diodes 44 and 46 of FIG. 4. The major portion of the characteristic curve of the diode 44 falls in the first quadrant and the major portion of the characteristic curve of the diode 46 falls in the third quadrant.

Assume that in the absence of a pulse from the input source 40 the value of the constant current supplied by the source 48 is adjusted to the value $I_{constant}$, that the direct-current resistance of the inductor 42 is negligible, that the characteristic curves of the diodes 44 and 46 are approximately the same, and that the resistances of the sources 40 and the device 49 are each at least ten times greater than the resistance of the series-opposed diodes 44 and 46. Under these conditions, negligible current flows from the source 48 through the source 40 and the device 49, and the current through the diode 44 is approximately equal to the current through the diode 46. More specifically, the current through and the voltage across the diode 44 is represented by a point 500 in the first quadrant of the depiction of FIG. 5A, and the current through and the voltage across the diode 46 is represented by a point 501 in the third quadrant of FIG. 5A. The difference between the currents represented by the points 500 and 501 is the current value $I_{constant}$, and the algebraic sum of the voltages represented by the points 500 and 501 is zero.

Further, in accordance with one aspect of the principles of the present invention, the value of the current $I_{constant}$ supplied by the source 48 of FIG. 4 is adjusted such that the vertical distance $\Delta_1$ shown in FIG. 5A is greater than the vertical distance $\Delta_2$ of FIG. 5A. $\Delta_1$ indicates the current difference between the current values represented by the quiescent point 500 and the valley point 502, and between the quiescent point 501 and the valley point 503. $\Delta_2$ indicates the current difference between the current values represented by the point 500 and the peak point 504, and between the quiescent point 501 and the peak point 505.

Assume now that a positive input current pulse of an amplitude greater than $\Delta_1$, and advantageously of an amplitude just exceeding $\Delta_1$, is supplied by the bipolar input pulse source 40 of the circuit shown in FIG. 4. The direction of flow of this current is from the upper side of the source 40 downward through the diodes 44 and 46 and then to the lower side of the source 40, as indicated in FIG. 4 by the dotted line and the arrowheads thereon. A negligible part of this current flows through the inductor 42 because the inductor possesses the property of current inertia; a negligible part of this current flows through the device 49 because, as specified above, its resistance is selected to be many times greater than the resistance of the series-opposed diodes 44 and 46; and no part of this current flows through the source 48 because by definition the current therethrough remains invariable at the value $I_{constant}$.

Accordingly, substantially the entire positive input current pulse from the source 40 initially flows downward through the series-opposed diodes 44 and 46, thereby, as indicated in FIG. 5A by dotted lines, causing the operating point of the diode 44 to shift from the quiescent point 500 to the point 506 and causing the operating point of the diode 46 to switch from the quiescent point 501 to the point 507. Then, as the positive input pulse returns to a zero level, the operating point of the diode 44 returns to the quiescent point 500 and the operating point of the diode 46 shifts from the point 507 to the point 508 which represents the same current value as the quiescent point 501.

Thereafter, due to the collapse of the magnetic field about the inductor 42, the operating point of the diode 46 charges toward the peak point 505, switches to a point 509 and then charges back to the quiescent point 501. During the time in which the operating point of the diode 46 is moving from the point 508 to the point 505 to the point 509 and back to the quiescent point 501, the operating point of the diode 44 shifts to the point 510 and then back to the quiescent point 500.

As can be clearly seen from FIG. 5A, the voltage excursion of the switched diode 46 in response to a positive input pulse is greater than that of the unswitched diode 44. As a result, a relatively large positive voltage pulse appears at the output, i.e., across the utilization device 49, of the circuit of FIG. 4. The width of this output pulse is mainly dependent upon the value of the inductor 42 and the value of $\Delta_2$, is typically greater than the width of an input pulse, and is largely independent of variations in the width of input pulses.

Assume now that a negative input current pulse of an amplitude greater than $\Delta_1$, and advantageously of an amplitude just exceeding $\Delta_1$, is supplied by the bipolar input pulse source 40 of the circuit of FIG. 4. The direction of flow of this current is from the lower side of the source 40 upwards through the diodes 46 and 44 and then to the upper side of the source 40, as indicated in FIG. 4 by the dot-dash line and the arrowheads thereon. For the reasons given above, a negligible part of this current flows initially through the inductor 42, the device 49, and the source 48. Accordingly, substantially the entire negative input current pulse from the source 40 flows initially upwards through the series-opposed diodes 46 and 44, thereby, as indicated in FIG. 5A by dot-dash lines, causing the operating point of the diode 44 to switch from the quiescent point 500 to the point 511 and causing the operating point of the diode 46 to shift from the quiescent point 501 to the point 512. Then, as the negative input pulse returns to a zero level, the operating point of the diode 44 shifts from the point 511 to a point 514 which represents the same current value as the quiescent point 500, and the operating point of the diode 46 returns to the quiescent point 501.

Thereafter, due to the collapse of the magnetic field about the inductor 42, the operating point of the diode 44 charges toward the peak point 504, switches to a point 516 and then charges back to the quiescent point 500. During the time in which the operating point of the diode 44 is moving from the point 514 to the point 504 to the point 516 and back to the quiescent point 500, the operating point of the diode 46 shifts to the point 518 and then back again to the quiescent point 501.

As can be clearly seen from FIG. 5A, the voltage excursion of the switched diode 44 in response to a negative input pulse is greater than that of the unswitched diode 46. As a result, a relatively large negative voltage pulse appears at the output, i.e., across the utilization device 49, of the circuit of FIG. 4.

It is noted that following the initial adjustment of the source 48 of FIG. 4 to provide the current value $I_{constant}$, and in the absence of an input pulse from the source 40, the operating points of the diodes 44 and 46 may by chance fall at the points 514 and 508, respectively, rather than at the desired quiescent points 500 and 501, respectively. This chance occurrence can be easily corrected for by supplying a single positive or negative pulse at least of magnitude $\Delta_2$ from the source 40. Such a pulse causes the diodes 44 and 46 to come to rest at the quiescent points 500 and 501, respectively, regardless of whether their initial operating points were the points 514 and 508 or the desired points 500 and 501. Accordingly, as a regular practice, upon first turning on the circuit of FIG. 4, a single pulse should be supplied from the source 40 to ready or prime the circuit of FIG. 4 for the intended mode of operation described above.

Assume now, in accordance with another aspect of the principles of the present invention, that the value of the current $I_{constant}$ supplied by the source 48 of FIG. 4 is adjusted such that the vertical distance $\Delta_1$ is less than the vertical distance $\Delta_2$. This condition is graphically depicted in FIG. 5B.

For the type of operation illustrated in FIG. 5B, it is possible that the operating points of the diodes 44 and 46 may initailly by chance fall at the points 554 and 558, respectively, rather than at the desired quiescent points 550 and 551, respectively. This chance occurrence can be easily corrected for by supplying a single positive or negative pulse at least of magnitude $\Delta_1$ from the source 40. Such a priming pulse causes the diodes 44 and 46 to come to rest at the quiescent points 550 and 551, respectively, regardless of whether their initial operating points were the points 554 and 558 or the desired points 550 and 551. Accordingly, as noted above, a single initial pulse should be supplied from the source 40 upon first turning on the circuit of FIG. 4, thereby readying the circuit for the type of operation illustrated in FIG. 5B and described hereinbelow.

Assume now that a positive input current pulse of an amplitude greater than $\Delta_2$, and advantageously of an amplitude just exceeding $\Delta_2$, is supplied by the bipolar input pulse source 40 of the circuit of FIG. 4. Substantially the entire amount of this positive input current pulse flows initially downward through the series-opposed diodes 44 and 46, thereby, as indicated in FIG. 5B by dotted lines, causing the operating point of the diode 44 to switch from the quiescent point 550 to the point 552, and causing the operating point of the diode 46 to shift from the quiescent point 551 to the point 563. Then, as the positive input pulse returns to a zero level, the operating point of the diode 44 shifts from the point 552 to the point 554 which represents the same current value as the quiescent point 550, and the operating point of the diode 46 returns to the quiescent point 551.

Thereafter, due to the collapse of the magnetic field about the inductor 42, the operating point of the diode 44 charges toward the valley point 560, switches to the point 561 and then charges back to the quiescent point 550. During the time in which the operating point of the diode 44 is moving from the point 554 to the point 560 to the point 561 and back to the quiescent point 550, the operating point of the diode 46 shifts to the point 553 and then back to the quiescent point 551.

As can be clearly seen from FIG. 5B, the voltage excursion of the switched diode 44 in response to a positive input pulse is greater than that of the unswitched diode 46. As a result, a relatively large positive voltage pulse appears at the output, i.e., across the utilization device 49, of the circuit of FIG. 4 for the type of operation illustrated in FIG. 5B.

Assume now that a negative input current pulse of an amplitude greater than $\Delta_2$, and advantageously of an amplitude just exceeding $\Delta_2$, is supplied by the bipolar input pulse source 40 of FIG. 4. Initially, substantially the entire negative input current pulse from the source 40 flows upward through the series-opposed diodes 46 and 44, thereby, as indicated in FIG. 5B by dot-dash lines, causing the operating point of the diode 46 to switch from the quiescent point 551 to the point 565 and causing the operating point of the diode 44 to shift from the quiescent point 550 to the point 566. Then, as the negative input pulse returns to a zero level, the operating point of the diode 46 shifts from the point 565 to the point 558 which represents the same current value as the quiescent point 551, and the operating point of the diode 44 returns to the quiescent point 550.

Thereafter, due to the collapse of the magnetic field about the inductor 42, the operating point of the diode 46 charges toward the valley point 570, switches to a point 571 and then charges back to the quiescent point 551. During the time in which the operating point of the diode 46 is moving from the point 558 to the point 570 to the point 571 and back to the quiescent point 551, the operating point of the diode 44 shifts to the point 575 and then back again to the quiescent point 550.

As can be clearly seen from FIG. 5B, the voltage excursion of the switched diode 46 in response to a negative input pulse is greater than that of the unswitched diode 44. As a result, a relatively large negative voltage pulse appears at the output, i.e., across the utilization device 49, of the circuit of FIG. 4.

FIG. 5C depicts two positive and one negative input pulses supplied by the bipolar input pulse source 40 of the circuit of FIG. 4, and, further, shows the corresponding output pulses which are produced by the circuit of FIG. 4 and coupled to an output path that includes the utilization device 49.

FIG. 6 is a more detailed showing of the illustrative embodiment depicted in FIG. 4. In particular, FIG. 6 indicates that the constant current source 48 of FIG. 4 comprises a direct-current source 60 and a relatively large resistor 61 in series therewith. (In a theoretically perfect constant current source the series resistor 61 would have an infinitely large value.) The characteristic curve of the diode 46 shunted with resistor 61 is different from the characteristic curve of the diode 44 alone. Accordingly, the diode 44 is also shunted with a resistor 62 to make the characteristic curve of the combination of the diode 44 and the resistor 62 approximately the same as that of the diode 46 and the resistor 61. Because of this matching of characteristics the absolute amplitudes and widths of the output pulses of the circuit of FIG. 6 are independent of the polarity of the input pulses thereto.

The speed of operation and the input pulse power requirements of the illustrative circuits of FIGS. 4 and 6 depend to a large extent on the presence therein of a properly chosen inductor. The value of the inductor 42 is chosen so that the output pulse width is larger than the trigger pulse width.

One illustrative set of values for the circuit components of the arrangement shown in FIG. 6 is as follows: inductor 42—10 microhenries; negative resistance diodes 44 and 46—germanium tunnel diodes, peak current 10 milliamperes, valley current 2 millamperes; resistor 61—400 ohms; resistor 62—400 ohms; direct-current source 60—4 volts; resistance of utilization device 49—100 ohms; resistance of bipolar input pulse source 40—100 ohms. Such a circuit is capable of operating at an input pulse repetition rate of about 500 kilopulses per second.

It is emphasized that although particular attention herein has been directed to the use of tunnel diodes as the components 44 and 46 of the circuits of FIGS. 4 and 6, other two-terminal voltage-controlled negative resistance arrangements having characteristics of the type shown in FIGS. 1B and 2B may also be used therefor.

It is to be understood that the above-described arrangements are only illustrative of the application of the principles of the present invention. Numerous other arrangements may be devised by those skilled in the art without departing from the spirit and scope of this invention. For example, the source 48 of FIG. 4 may be connected across the diode 44 instead of across the diode 46. Also, the series-opposed diodes 44 and 46 may have their plates (instead of their cathodes) connected together and to one side of a constant current source; in such a case the direction of current flow through the constant current source is opposite that indicated in FIGS. 4 and 6.

What is claimed is:

1. In combination in a bipolar monostable regenerative amplifying circuit, two voltage-controlled negative resistance diodes connected in series-opposition, constant current source means connected in parallel with one of said series-opposed diodes, inductance means connected in parallel with said series-opposed diodes, bipolar input pulse source means connected in parallel with said inductance means, and an output means responsive to the voltage across said series-opposed diodes.

2. In combination, two voltage-controlled negative resistance diodes connected in series-opposition, and inductance means connected in parallel with said diodes.

3. A combination as in claim 2 further including a constant current source connected in parallel with one of said diodes.

4. In combination in a bipolar monostable regenerative amplifying circuit, two voltage-controlled negative resistance diodes connected in series-opposition, a series arrangement including first resistance means and direct-current source means connected in parallel with one of said diodes, second resistance means connected in parallel with the other one of said diodes, inductance means connected in parallel with said diodes, bipolar input pulse source means connected in parallel with said inductance means, and a utilization device connected in parallel with said diodes.

5. In combination, two tunnel diodes connected in series-opposition, inductance means connected in parallel with said series-opposed diodes, means connected to said series-opposed diodes for biasing them to corresponding operating points on the voltage-current characteristic curves thereof, bipolar input pulse source means connected in parallel with said inductance means, and output means responsive to the voltage appearing across said series-opposed diodes.

6. A bipolar monostable regenerative amplifying circuit comprising two tunnel diodes connected in series-opposition, an inductor connected in parallel with said series-opposed diodes, means for biasing said diodes to corresponding operating points on their voltage-current characteristic curves, input source means for switching one of said series-opposed diodes, and output means responsive to the switching of said one diode.

7. In combination, two tunnel diodes connected in series-opposition, source means for biasing said diodes to corresponding operating points on selected positive resistance portions of their voltage-current characteristic curves, and means for causing one diode to switch from its operating point on the selected positive resistance portion of its characteristic curve to another positive resistance portion of its characteristic curve and then back again to its operating point on the selected positive resistance portion and for causing the other diode to shift about its operating point on the selected positive resistance portion of its characteristic curve.

8. A bipolar monostable regenerative amplifying circuit comprising two voltage-controlled negative resistance diodes connected in series-opposition, inductance means connected in parallel with said series-opposed diodes, and biasing means connected to said diodes for causing equal forward currents to respectively flow therethrough and for establishing across said diodes voltages whose magnitudes are respectively equal.

9. A circuit as in claim 8 further comprising bipolar input pulse source means connected in parallel with said inductance means.

10. A circuit as in claim 9 still further comprising output means connected in parallel with said diodes.

References Cited in the file of this patent

UNITED STATES PATENTS

| | | |
|---|---|---|
| 2,888,648 | Herring | May 26, 1959 |
| 2,905,885 | Burt et al. | Sept. 22, 1959 |
| 2,966,599 | Haas | Dec. 27, 1960 |

OTHER REFERENCES

Chow: "Transient Analysis of Transistor Amplifiers," Electronics, November 1953, page 189.

Handbook of Semiconductor Electronics (Hunter), 1956.